(12) United States Patent
Yan

(10) Patent No.: US 10,932,638 B2
(45) Date of Patent: Mar. 2, 2021

(54) ROBOT TRAPPING DETECTING DEVICE

(71) Applicant: Jason Yan, New Taipei (TW)

(72) Inventor: Jason Yan, New Taipei (TW)

( * ) Notice: Subject to any disclaimer, the term of this patent is extended or adjusted under 35 U.S.C. 154(b) by 272 days.

(21) Appl. No.: 16/285,187

(22) Filed: Feb. 25, 2019

(65) Prior Publication Data

US 2020/0196821 A1     Jun. 25, 2020

(30) Foreign Application Priority Data

Dec. 20, 2018   (TW) .................................. 107146094

(51) Int. Cl.
| | |
|---|---|
| *A47L 11/40* | (2006.01) |
| *G05D 1/02* | (2020.01) |
| *B25J 5/00* | (2006.01) |
| *B25J 19/02* | (2006.01) |
| *B25J 11/00* | (2006.01) |

(52) U.S. Cl.
CPC ............ *A47L 11/4011* (2013.01); *B25J 5/007* (2013.01); *B25J 11/0085* (2013.01); *B25J 19/027* (2013.01); *G05D 1/0227* (2013.01); *G05D 1/0259* (2013.01); *A47L 2201/04* (2013.01); *G05D 2201/0215* (2013.01)

(58) Field of Classification Search
CPC ............ A47L 11/4011; A47L 2201/04; A47L 11/4066; A47L 11/4061; G05D 1/0227; G05D 1/0259; G05D 2201/0215; B25J 5/007; B25J 19/027; B25J 11/0085
See application file for complete search history.

(56) References Cited

U.S. PATENT DOCUMENTS

| | | | |
|---|---|---|---|
| 2007/0016328 A1* | 1/2007 | Ziegler | A47L 7/0028 700/245 |
| 2010/0263948 A1* | 10/2010 | Couture | B62D 55/065 180/8.2 |
| 2015/0150429 A1* | 6/2015 | Yoo | A47L 11/4061 173/1 |
| 2017/0150862 A1* | 6/2017 | Machida | A47L 9/28 |
| 2017/0332857 A1* | 11/2017 | Nam | A47L 9/1691 |
| 2018/0035860 A1* | 2/2018 | Tsuboi | A47L 9/2852 |
| 2018/0181136 A1* | 6/2018 | Loosararian | G01B 17/025 |

* cited by examiner

*Primary Examiner* — Mary Cheung
(74) *Attorney, Agent, or Firm* — Chun-Ming Shih; HDLS IPR Services

(57) ABSTRACT

A robot trapping detecting device, mainly uses a shaft body to drive a convex body to rotate, and a convex portion is disposed around the convex body, so when a binding surface of a binding body is touched to the convex body and the convex body is rotated to the disposing position of the convex portion, the binding body is driven upward, and then, when the convex body is rotated to a position other than the disposing position of the convex portion, the binding body is driven downward, so that a sensed body disposed on a linking component is driven up and down by the linking component, and a sensing body senses a displacement change of the sensed body to determine whether a robot has stopped moving.

10 Claims, 7 Drawing Sheets

ROBOT TRAPPING DETECTING DEVICE

BACKGROUND OF THE INVENTION

Field of the Invention

The present invention provides a robot trapping detecting device, and more particularly, to a trapping detecting device which senses a displacement change of a sensed body through a sensing body to determine whether a robot has stopped moving.

Description of the Prior Art

With fast developing technology, robots have been widely used in many different fields to assist or replace human beings in a variety of tasks. However, due to their different needs, the types of robots used are also different, such as industrial robots or home-based robots.

Among them, regarding home-type robots, the sweeping robot is one of the common robots, which is applied to house/office cleaning or related fields to help people complete the cleaning works with the automatic cleaning function of the sweeping robot.

The conventional sweeping robot has sensors disposed around the robot to sense whether there is an obstacle in the path of the robot, so as to achieve the function of avoiding obstacles. However, if the robot enters a small space and is trapped, the sensors may fail to effectively sense that the robot has been trapped and cannot deliver relevant information to the user.

Therefore, it is necessary to provide a device which can sense whether a robot is trapped, thereby solving the problem needed to be improved in the prior art.

SUMMARY OF THE INVENTION

In order to solve the problems described above, it is an object of the present invention to provide a robot trapping detecting device that utilizes a shaft body to drive a convex body to rotate, so as to drive a binding body to move up and down through the periphery of the convex body and a convex portion, thereby causing a sensed body disposed on a linking component to be displaced up and down, and then an sensing body senses the displacement change of the sensed body to determine whether a robot has stopped moving.

In order to achieve the above object, the present invention provides a robot trapping detecting device, which comprises:

a driving module comprising:
a wheel body;
a shaft body, the shaft body being connected with the wheel body; and
at least one convex body, the convex body being connected and linked with the shaft body, wherein the convex body is disposed with a convex portion surrounding the convex body;
a sensed module, the sensed module being pivotally connected with the driving module, comprising:
a supporting component, the supporting component being pivotally connected with the shaft body; and
a linking component, the linking component being pivotally connected with the supporting component, and the linking component being disposed with a sensed body on a face adjacent to the driving module, the linking component being disposed with at least one binding bodies on a face adjacent to the convex portion, wherein the binding body has a binding face, and the binding face is touched to the periphery of the convex body;
a sensing module, the sensing module being connected with the supporting component, and the sensing module having a sensing space between the sensing module and the sensed body to sense the sensed body.

Preferably, the sensing module comprises:
a base, the base being connected with the supporting component; and
a sensing body, the sensing body being disposed on a face of the base adjacent to the sensed body, and the sensing body having the sensing space between the sensing body and the sensed body to sense the sensed body.

Preferably, the base is connected with the supporting component; and the linking component and the sensed body are accommodated between the base and the supporting component, a moving space is disposed between the base and the supporting component and is provided for the linking component to move up and down.

Preferably, the supporting component extends to provide a pivoting portion, the pivoting portion passed through the linking component and the base to be pivotally connected with the interior of a robot.

Preferably, the sensing body is a Hall sensor.

In order to solve the problems described above, it is another object of the present invention to provide a robot trapping detecting device, which utilizes a shaft body to drive a sensed body to rotate, thereby causing the sensed body to move up/down or forward/reverse, and then sensing the displacement of the sensed body through a sensing body. After that, the sensing body can determine whether a robot has stopped moving.

In order to achieve the object, the present invention further provides a robot trapping detecting device, which comprises:

a driving module comprising:
a wheel body; and
a shaft body, the shaft body being connected with the wheel body;
a sensed body, the sensed body being disposed on the periphery of the shaft body; and
a sensing module, the sensing module being pivotally connected with the shaft body, and a sensing space is disposed between the sensing module and the sensed body to sense the sensed body.

Preferably, the sensing module comprises:
a base, the base being pivotally connected with the shaft body; and
a sensing body, the sensing body being disposed on a face of the base adjacent to the sensed body, and a sensing space is disposed between the sensing body and the sensed body to sense the sensed body.

In order to solve the problems of the prior art, it is still another object of the present invention to provide a robot trapping detecting device, which is provided with a sensed body disposed on the periphery of a shaft portion, when a driving body drives a driving gear to rotate, the shaft portion rotates correspondingly, so that the sensed body moves up/down or forward/reverse, and then a sensing body senses the sensed body. After the displacement change of the sensed body is detected, the sensing body can determine whether a robot has stopped moving.

In order to achieve the still another object, the present invention further provides a robot trapping detecting device, which comprises:

a driving module comprising:
  a driving body, the driving body having a driving portion; and
  a driving gear, the driving gear comprising a shaft portion and a tooth portion, the tooth portion engaging with the driving portion, thereby allowing the driving body to drive the driving gear to rotate;
  a sensed body, the sensed body being disposed on a periphery of the shaft portion; and
  a sensing module, the sensing module being disposed adjacent to the driving gear, and a sensing space is disposed between the sensing module and the sensed body to sense the sensed body.

Preferably, the driving gear can be any one of a spur gear, a bevel gear, a herringbone gear, a face gear, a screw gear, or a hypoid gear.

Preferably, the driving body can be a motor.

BRIEF DESCRIPTION OF THE DRAWINGS

The techniques of present invention would be more understandable from the detailed description given herein below and the accompanying figures are provided for better illustration, and thus description and figures are not limitative for present invention, and wherein.

DETAILED DESCRIPTION OF THE INVENTION

Figure 1:
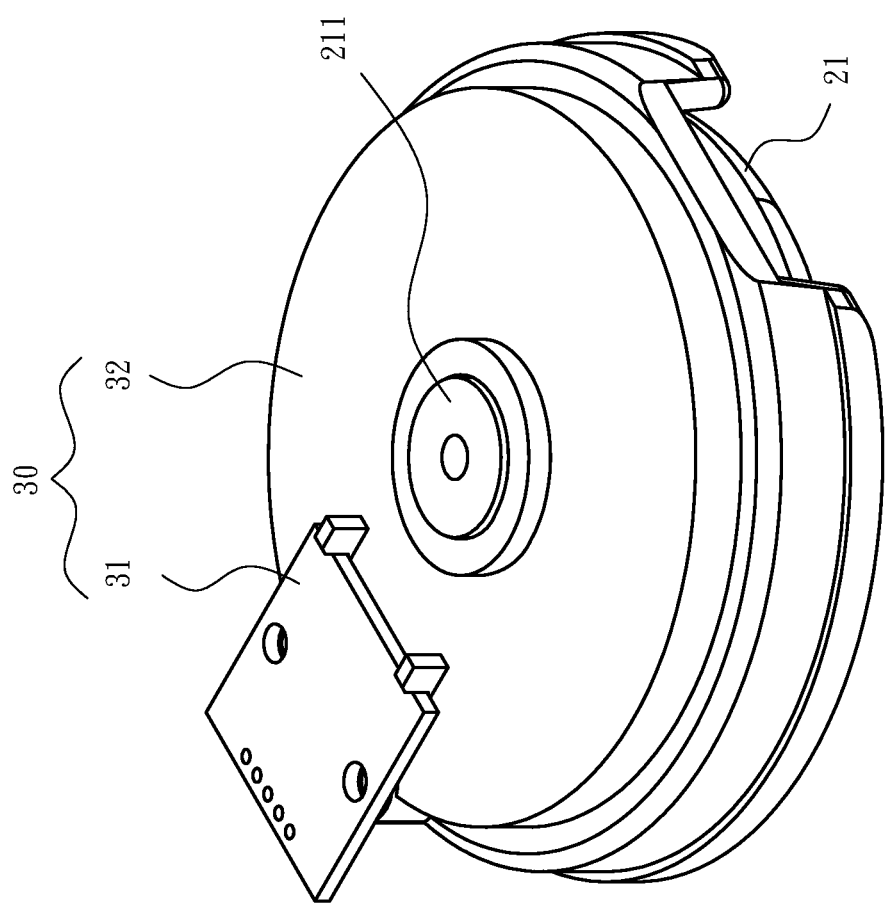
FIG. 1 illustrates a 3D view of a first embodiment of the present invention.
Figure 2:
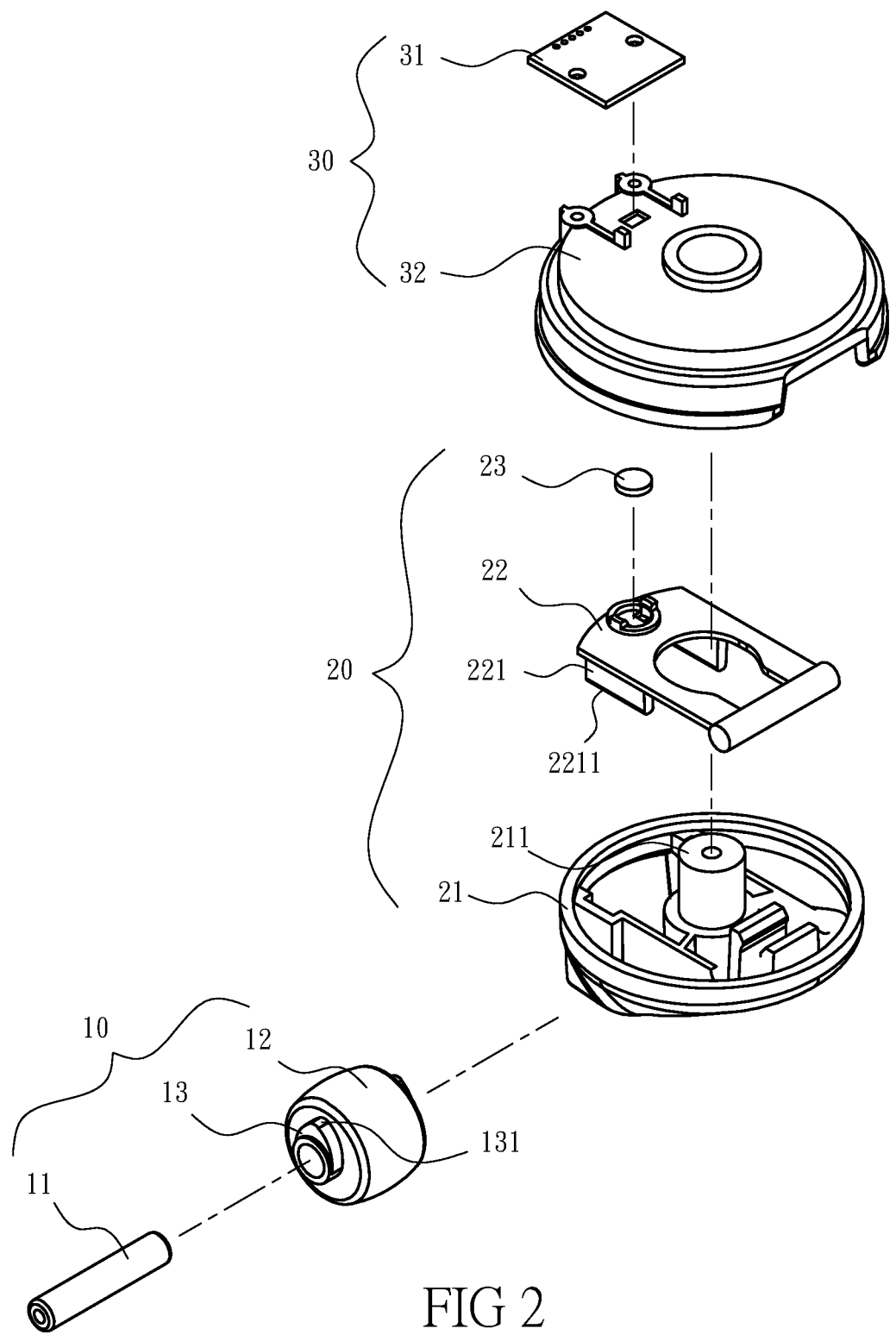
FIG. 2 illustrates an explosive view of the first embodiment of the present invention.
Figure 3:
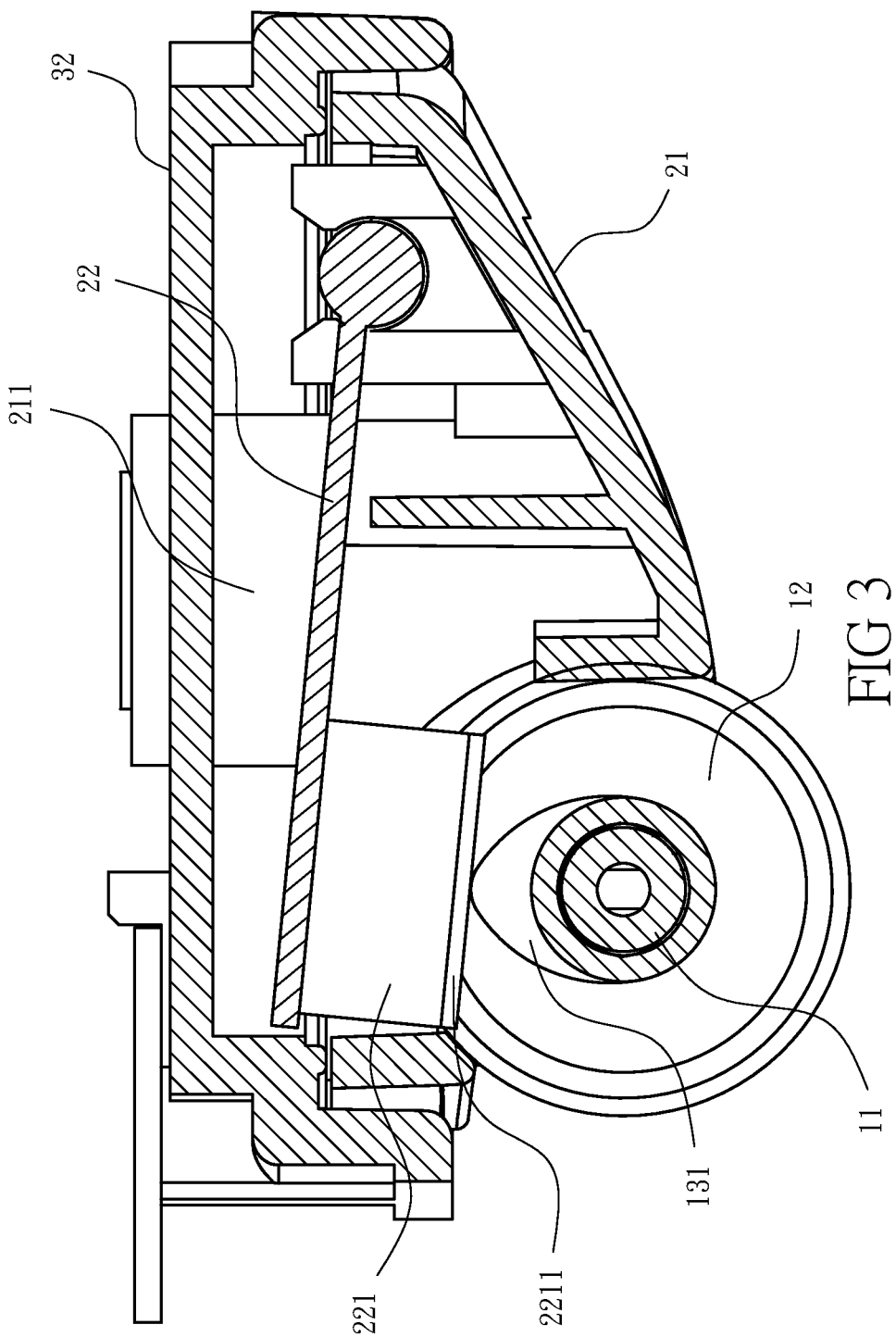
FIG. 3 illustrates a first operation scenario of a linking component of the first embodiment of the present invention.
Figure 4:
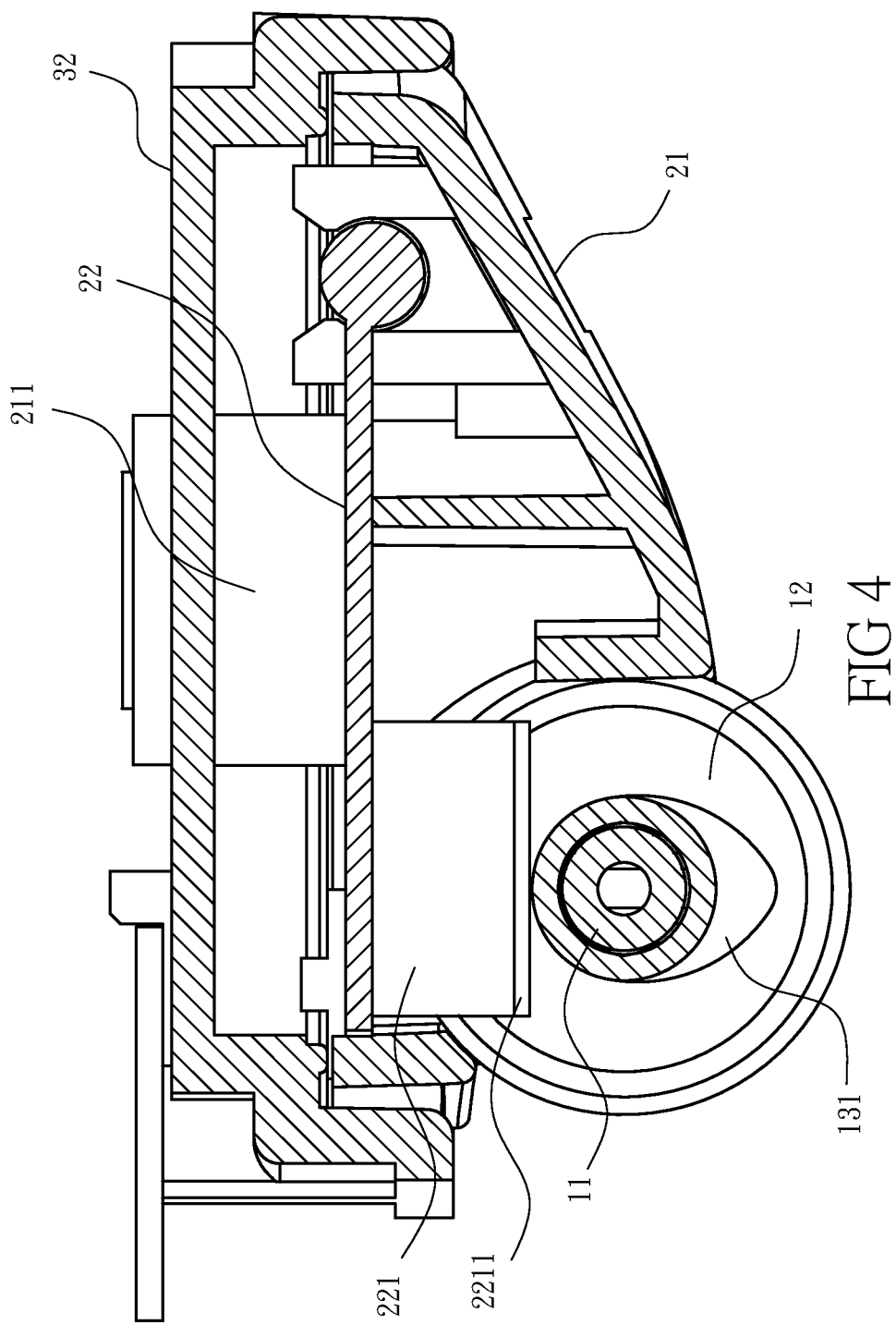
FIG. 4 illustrates a second operation scenario of the linking component of the first embodiment of the present invention.
Figure 5:
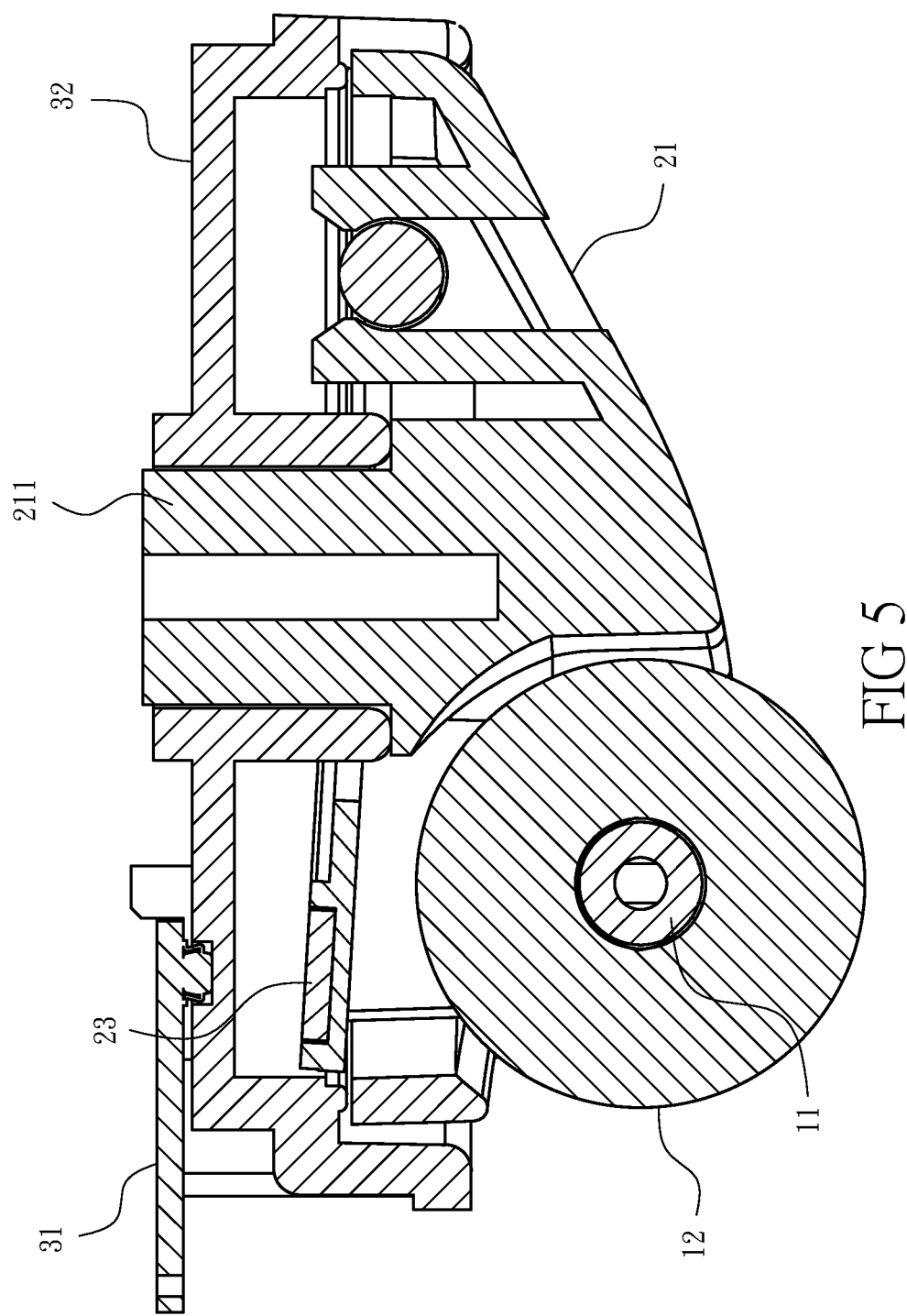
FIG. 5 illustrates a schematic view showing the inside of a sensed body and a sensing body of the first embodiment of the present invention.

The aspect of present invention is now described with the following preferred embodiment; however, the invention is not limited thereto.

Please refer to FIGS. 1 to 5, which illustrate a 3D view, a perspective view, an explosive view, a first operation scenario, a second operation scenario, and a schematic view showing the inside of a sensed body and a sensing body of the first embodiment of the present invention. As shown in the figures, the present invention mainly comprises a driving module 10, a sensed module 20, and a sensing module sensing module 30, wherein the driving module 10 can be a driven wheel or a driving wheel, while the driving module 10 is a driven wheel in the first embodiment. The driving module 10 includes a shaft body 11, a wheel body 12, and at least one convex body 13. The shaft body 11 is connected with the wheel body 12, and the shaft body 11 has two ends protruding from the two sides of the wheel body 12 such that the two end of the shaft body 12 are connected with the convex body 13 respectively. A convex portion 131 is disposed around the convex body 13, and when the wheel body 12 rotates forward or reverse, the wheel body 12 drives the shaft body 11 to rotate, and in turn the shaft body 11 drives the convex body 13 to rotate.

The sensed module 20 comprises a supporting component 21, a linking component 22 and a sensed body 23, wherein the supporting component 21 can be a bracket, and the supporting member 21 is pivotally connected with the shaft body 11 so that when a robot drives the supporting component 21 to move forward or backward, the wheel body 12 rotates forward or backward due to the frictional force generated between the wheel body 12 and the ground, and the fact that the shaft body 11 is pivotally connected with the supporting component 21, thereby causing the shaft body 11 to rotate. The linking component 22 is pivotally connected with the supporting component 21; specifically, the linking component 22 is pivotally connected with the supporting component 21 on a face different from the face where the supporting component 21 and the shaft body 11 are connected with each other. The linking component 22 has a binding body 221 disposed on one face, wherein the binding body 221 can be a plate or a C-shaped plate, and the bottom end of the binding body 221 is provided with a binding face 2211, the binding face 2211 is in contact with the periphery of the convex body 13, and the linking component 22 is further provided with the sensed body 23 on another face. The sensed body 23 is preferably a magnet, and the magnet is engaged with one face of the linking component 22. In this way, since the linking component 22 is pivotally connected with the supporting component 21, when the convex body 13 is rotated by the shaft body 11, the binding face 2211 of the binding body 221 moves the linking component 22 up and down along the convex portion 131 provided on the periphery of the convex body 13 or the portion other than the convex portion 131. The sensed body 23 is driven by the up/down movement of the linking component 22 to have up/down movement displacement change.

The sensing module 30 comprises a sensing body 31 and a base 32. The base 32 is connected with the supporting component 21, and the linking component 22 and the sensed body 23 are accommodated between the base 32 and the supporting component 21, besides, a moving space is provided between the base 32 and the supporting component 21 for the linking component 22 to move up and down, and the sensing body 31 is disposed on one face of the base 32 adjacent to the sensed body 23, so that a sensing space is formed between the sensing body 31 and the sensed body 23 for the sensing body 31 to sense the sensed body 23. In addition, the supporting component 21 further extends to provide a pivoting portion 211, wherein the pivoting portion 211 passes through the linking component 22 and the base 32 to be pivotally connected with the interior of the robot.

When an internal motor of the robot drives a set of driving wheels to rotate, and in turn the robot moves forward or backward, the driving module 10 moved by the robot also drives the wheel body 12 to rotate, and the shaft body 11 drives the convex body 13 to rotate. When the convex body 13 is rotated by the shaft body 11, the binding body 221 moves the linking component 22 up and down along the convex portion 131 provided on the periphery of the convex body 13 or the portion other than the convex portion 131. The sensed body 23 is also driven by the up/down movement of the linking component 22 to have up/down movement displacement change. At this time, since the sensing body 31 senses the displacement change of the sensed body 23, when the sensing body 31 senses that the sensed body 23 continues to move up and down, the sensing body 31 determines that the robot is not trapped.

However, when the robot is trapped and cannot move, the shaft body 11 will no longer drive the convex body 13 to rotate, and the binding body 221 will not drive the linking component 22 to move up and down. Therefore, when the sensed body 23 stops moving, the sensing body 31 senses that the sensed body 23 no longer has a displacement change, thereby determining that the robot is trapped.

Figure 6:
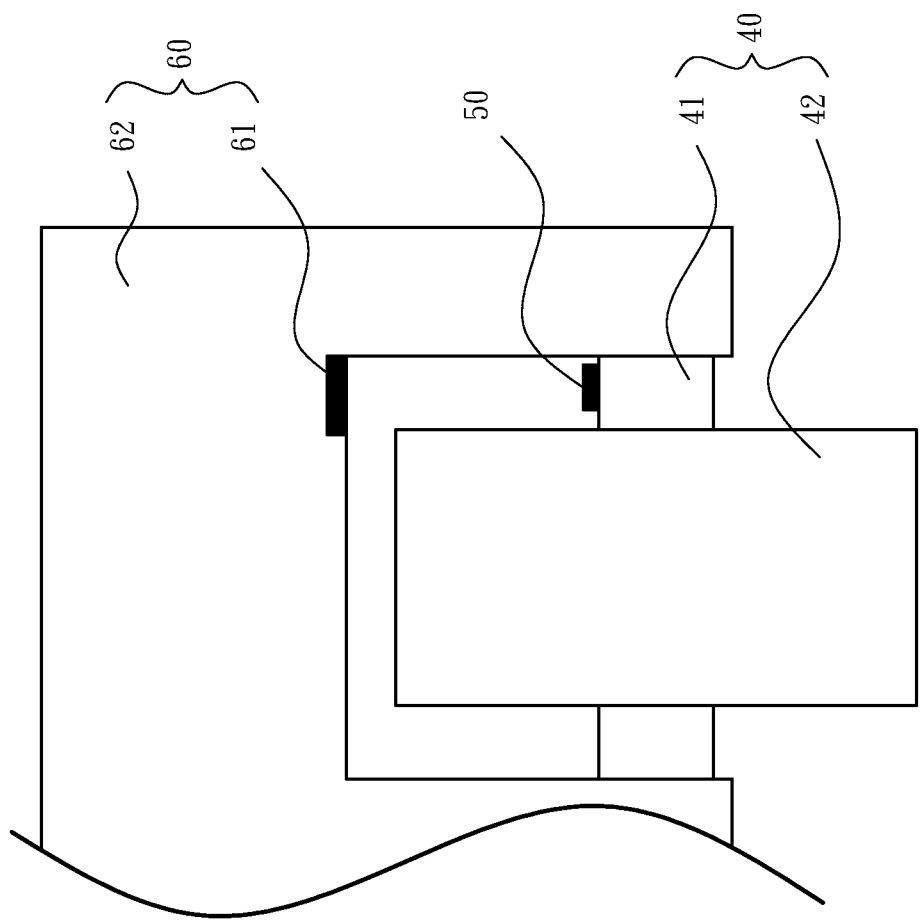
FIG. 6 illustrates a structural view of a second embodiment of the present invention.

Please refer FIG. 6 for a structural view of a second embodiment of the present invention. As shown in the figure, a driving module 40 of the present invention may also comprise a shaft body 41 and a wheel body 42, wherein the shaft body 41 is connected with the wheel body 42, and a sensed body 50 is disposed on the periphery of the shaft body 41 such that when the shaft body 41 is rotated by a robot, the sensed body 50 will be driven by the shaft body to rotate in a clockwise or counterclockwise trajectory.

The sensing module 60 is pivotally connected with the shaft body 41, and the sensing module 60 comprises a sensing body 61 and a base 62. The base 62 is pivotally connected with the shaft body 41, and the sensing body 61 is disposed on one face of the base 62 adjacent to the sensed body 50, and a sensing space is provided between the sensing body 61 and the sensed body 50 to sense the sensed body 50. Therefore, when the sensed body 50 is moving along a clockwise or counterclockwise trajectory, the sensing body 61 senses the displacement change of the sensed body 50 to determine that the robot is not trapped. However, when the sensing body 61 does not sense any displacement change of the sensed body 50, the sensing body 61 determines that the robot is trapped.

Figure 7:
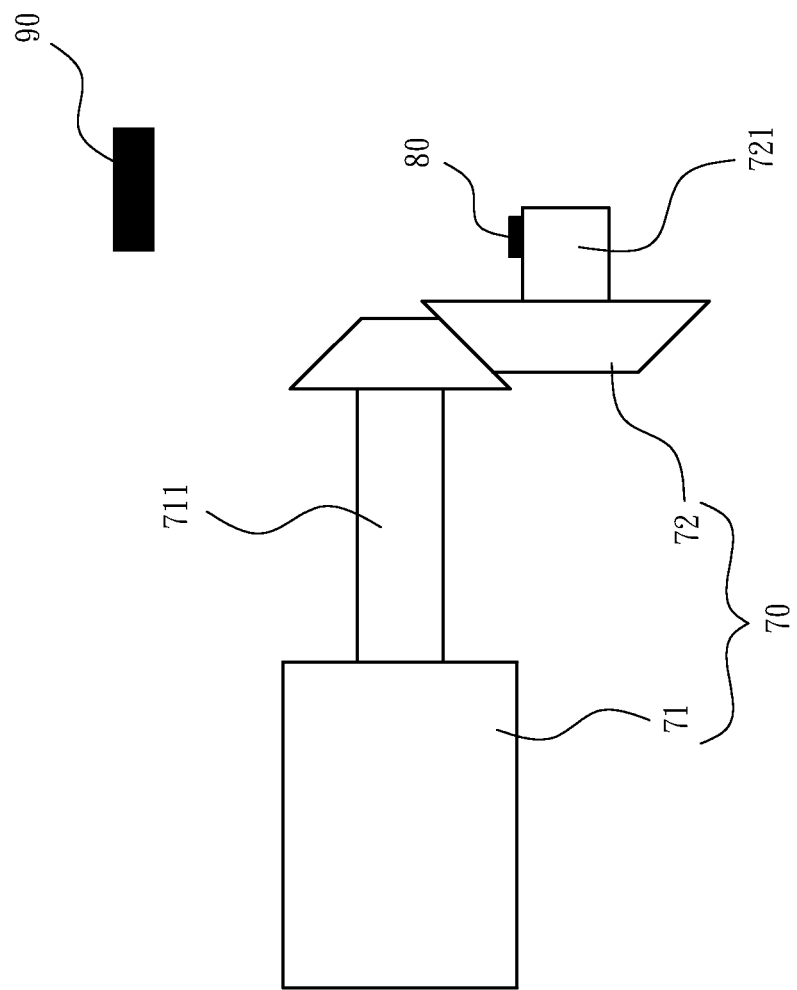
FIG. 7 illustrates a structural view of a third embodiment of the present invention.

Please refer to FIG. 7 for a structural view of a third embodiment of the present invention. As shown in the figure, the driving module 70 may also comprise a driving body 71 and a driving gear driving gear 72. The driving body extends to provide a driving portion 711, wherein the driving body 71 is specifically a motor, and the driving portion 711 is a screw that is driven by the driving body 71 to rotate, and the driving gear 72 can be a spur gear, a bevel gear, a herringbone gear, a face gear, a screw gear, or a hypoid gear, the driving gear 72 comprises a shaft portion 721 and a tooth portion, wherein the driving portion 711 is engaged with the tooth portion, and a sensed body 80 is disposed on the periphery of the shaft portion 721. When the driving body 71 drives the driving portion 711 to rotate, the driving portion 711 drives the driving gear 72 to rotate through the engaged tooth portion, and when the gear driving gear 72 is rotating, the shaft portion 721 also rotates correspondingly, so that the sensed body 80 moves in a clockwise or counterclockwise trajectory on the shaft portion 721. In addition, the sensing module 90 is disposed adjacent to the driving gear 72, wherein a sensing space is disposed between the sensing module 90 and the sensed body 80. Therefore, when the sensed body 80 is moving along a clockwise or counter-clockwise trajectory, the sensing module 90 senses the displacement change of the sensed body 80 to determine that the robot is not trapped. However, when the sensing module 90 does not sense any displacement change of the sensed body 80, sensing module 90 determines that the robot is trapped.

After the sensing module determines that the robot is trapped, the sensing module can transmit the obtained judgment message to a receiving module for use. Then the user knows that the robot has been trapped and cannot move, and performs related troubleshooting actions.

With the above-mentioned technical features, the present invention can effectively detect whether the robot is trapped. If the sensing body determines that the robot is trapped, it can provide related judgment messages to the user. Then the user knows that the robot has been trapped and cannot move and performs related troubleshooting actions.

It is noted that the terms "center", "horizontal", "upper", "lower", "left", "right", "top", "bottom", "inside" and "outside" showing orientation or positional relationship, are based on the orientation or positional relationship shown in the drawings, and are merely illustrated for the convenience of the description of the invention, rather than indicating or implying that the device or component referred in the figures must have a specific orientation, construction and operation, and therefore is not to be construed as limiting the invention.

The present invention has been described with preferred embodiment of the present invention; however, this embodiment is not intended to limit the scope of the patent of the present invention. Many changes and modifications in the above described embodiment of the invention can, of course, be carried out without departing from the scope thereof. Accordingly, to promote the progress in science and the useful arts, the invention is disclosed and is intended to be limited only by the scope of the appended claims.

What is claimed is:

1. A robot trapping detecting device comprising:
   a driving module comprising:
      a wheel body;
      a shaft body, the shaft body being connected with the wheel body; and
      at least one convex body, the convex body being connected and linked with the shaft body, wherein the convex body is disposed with a convex portion surrounding the convex body;
   a sensed module, the sensed module being pivotally connected with the driving module, comprising:
      a supporting component, the supporting component being pivotally connected with the shaft body; and
      a linking component, the linking component being pivotally connected with the supporting component, and the linking component being disposed with a sensed body on a face adjacent to the driving module, the linking component being disposed with at least one binding bodies on a face adjacent to the convex portion, wherein the binding body has a binding face, and the binding face is touched to the periphery of the convex body; and
   a sensing module, the sensing module being connected with the supporting component, and the sensing module having a sensing space between the sensing module and the sensed body to sense the sensed body.

2. The robot trapping detecting device as claimed in claim 1, wherein the sensing module comprises:
   a base, the base being connected with the supporting component; and
   a sensing body, the sensing body being disposed on a face of the base adjacent to the sensed body, and the sensing body having the sensing space between the sensing body and the sensed body to sense the sensed body.

3. The robot trapping detecting device as claimed in claim 2, wherein the base is connected with the supporting component, and the linking component and the sensed body are accommodated between the base and the supporting component, a moving space is disposed between the base and the supporting component and is provided for the linking component to move up and down.

4. The robot trapping detecting device as claimed in claim 2, wherein the supporting component extends to provide a pivoting portion, the pivoting portion is passed through the linking component and the base is pivotally connected with the interior of a robot.

5. The robot trapping detecting device as claimed in claim 1, wherein the sensing body is a Hall sensor.

6. A robot trapping detecting device comprising:
a driving module comprising:
  a wheel body; and
  a shaft body, the shaft body being connected with the wheel body;
a sensed body, the sensed body being disposed on the periphery of the shaft body; and
a sensing module, the sensing module being pivotally connected with the shaft body, and a sensing space is disposed between the sensing module and the sensed body to sense the sensed body.

7. The robot trapping detecting device as claimed in claim 6, wherein the sensing module comprises:
a base, the base being pivotally connected with the shaft body; and
a sensing body, the sensing body being disposed on a face of the base adjacent to the sensed body, and a sensing space is disposed between the sensing body and the sensed body to sense the sensed body.

8. A robot trapping detecting device comprising:
a driving module comprising:
  a driving body, the driving body having a driving portion; and
  a driving gear, the driving gear comprising a shaft portion and a tooth portion, the tooth portion engaging with the driving portion, thereby allowing the driving body to drive the driving gear to rotate;
a sensed body, the sensed body being disposed on a periphery of the shaft portion; and
a sensing module, the sensing module being disposed adjacent to the driving gear, and a sensing space is disposed between the sensing module and the sensed body to sense the sensed body.

9. The robot trapping detecting device as claimed in claim 8, wherein the driving gear is a spur gear, a bevel gear, a herringbone gear, a face gear, a screw gear, or a hypoid gear.

10. The robot trapping detecting device as claimed in claim 8, wherein the driving body is a motor.

* * * * *